United States Patent [19]

Hiramatsu

[11] Patent Number: 4,812,631
[45] Date of Patent: Mar. 14, 1989

[54] BAR CODE AND READ-OUT METHOD THEREOF
[75] Inventor: Keiji Hiramatsu, Tokyo, Japan
[73] Assignee: Kam Kwong Lee Limited, Hong Kong
[21] Appl. No.: 56,999
[22] Filed: Jun. 2, 1987
[51] Int. Cl.4 .................................................. G06K 7/10
[52] U.S. Cl. ...................................... 235/467; 235/468
[58] Field of Search .................................... 235/467, 468

[56] References Cited

U.S. PATENT DOCUMENTS 3,810,159 5/1974 Hinks .............................. 235/46 B Primary Examiner—Harold I. Pitts
Attorney, Agent, or Firm—Ladas & Parry

[57] ABSTRACT

A conventional bar code and a method of reading the same are so adapted that rays are irradiated on the bar code formed on a semiconductor wafer, and that reflected rays from the bar code are read out by a bar code reader to sense the bar code so that a misreading rate is increased by means of reflection of the surface of a wafer and due to the surface profile of the bar code. In contrast, according to a bar code and a method of reading the same in accordance with the present invention, the bar code is formed of a film or the like of aluminum or the like on the semiconductor wafer, and infrared rays are irradiated on the bar code, penetrated infrared rays from the semiconductor wafer being read out by the bar code reader so that a bar code reading may be effectively made without being influenced by reflection of the wafer surface and surface profile with a better S/N ratio and at a lower misreading rate.

10 Claims, 3 Drawing Sheets

BAR CODE AND READ-OUT METHOD THEREOF

BACKGROUND OF THE INVENTION

This invention relates to a bar code which utilizes penetrability of infrared rays and a method of reading the bar code. A semiconductor wafer thus theretofore been adapted to record the bar code on its surface and to then read it thereby establishing a product control.

FIG. 1 is a view showing the general manner in which a bar code 2 formed on a semiconductor wafer 1 is read. According to this manner, the bar code 2 recorded on the lower portion of the semiconductor wafer 1 in a disc form is optically read by a reflector type bar code reader 10 positioned so as to face the semiconductor wafer 1. A semiconductor laser 11 which serves as a light source, is disposed within the bar code reader 10 and emits laser beams LK to then irradiate it through an optical lens 12 on a rotating mirror 12. The laser beams are scanned by the rotation of the rotating mirror 13 and irradiated on the bar code 2 on the semiconductor wafer 1. Reflected beams FK from the bar code 2 are incident to the interior of the bar code reader 10 and are received or sensed through a lens 14 by a photodetector 15 so that a bar code data BD which has been converted to an electrical signal is outputted.

In the aforementioned reading method, the surface of the semiconductor wafer 1 is generally mirror processed or finished, and the wafer 1 has been chemically processed in a step of a manufacturing process and is always subjected to variations in its surface profile. This is also the case with the surface profile of the bar code 2 if the latter is directly marked on the wafer. Under such circumstances, the aforementioned reflector type bar code reader 10 is likely to show a lower S/N ratio of the photodetector 15 due to the influence of the reflection of beam on the surface of the semiconductor wafer 1 and variation of the surface profile of the bar code 2 resulting in increase of a rate of misreading of the bar code 2. This will be of no use for the desired end, and its solution has been desired.

SUMMARY OF THE INVENTION

The present invention is provided to solve the aforementioned problems. It is an object of the invention to provide a bar code and a method for reading the same which utilizes penetrability of infrared rays with respect to a semiconductor wafer and which is capable of reading the bar code at a tight speed with accuracy and at a lower misreading rate.

According to one aspect of this invention, for achieving the objects described above, there is provided a bar code characterized in that said bar code is formed of a member for reflecting or absorbing infrared rays on a semiconductor wafer which is penetrated with said infrared rays.

According to another aspect of this invention, there is provided a method of reading a bar code characterized in that said bar code which is formed of a member for reflecting or absorbing infrared rays on a semiconductor wafer is irradiated by infrared rays, and that penetrated infrared rays from said semiconductor wafer is read out by an optical sensor.

The nature, principle and utility of the invention will become more apparent from the following detailed description when read in conjunction with the accompanying drawings.

DESCRIPTION OF THE PREFERRED EMBODIMENTS

Figure 1:
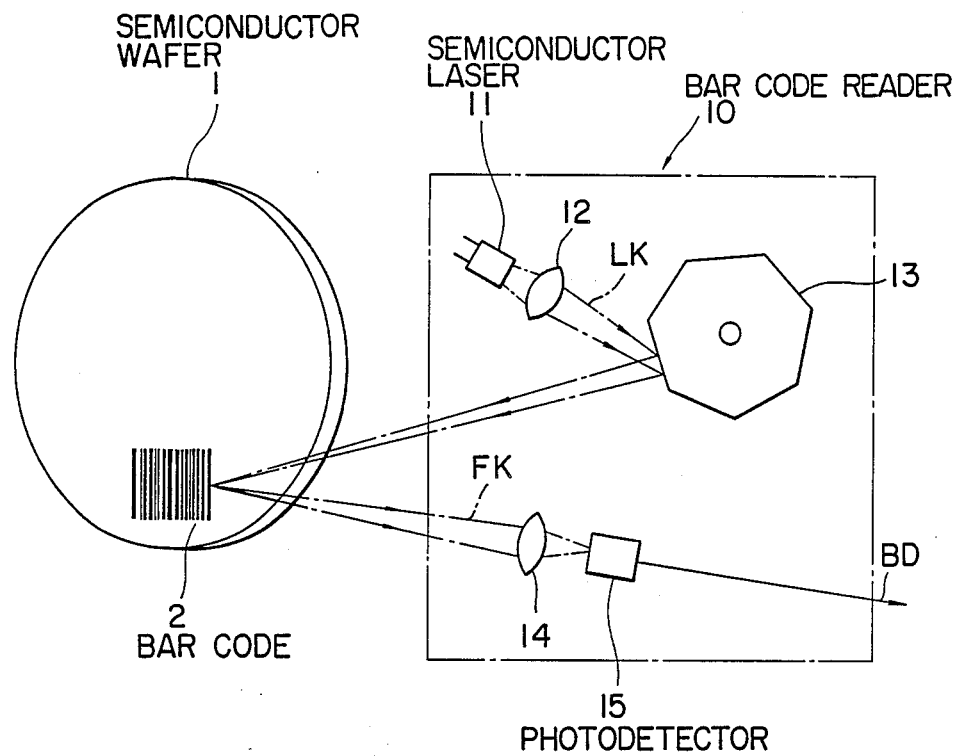
FIG. 1 is a view showing the conventional manner in which a bar code is read.
Figure 2:
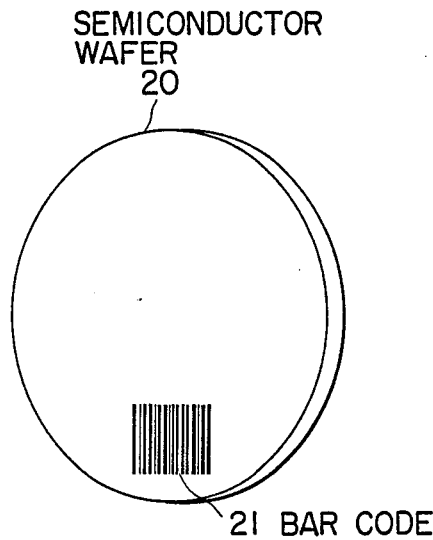
FIG. 2 is a perspective view of semiconductor wafer used in the present invention.
Figure 3:
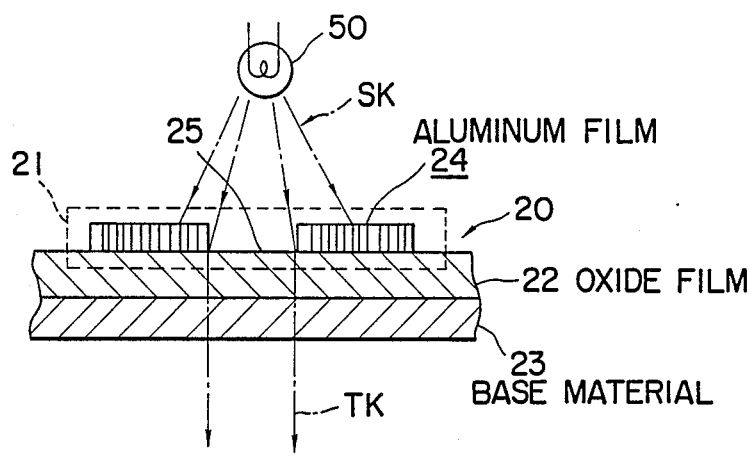
FIG. 3 is a representation showing the bar code of the invention and the principle of reading the same.

A semiconductor wafer (Si in this instance) used in the present invention is in a disc form as shown in FIG.2. The semiconductor wafer 20 is provided on its surface and downwardly thereof with a bar code in a predetermined pattern. The bar code 21 is obtained in such a manner that an oxide film ($S_iO_2$) 22 is formed on a base material ($S_i$) 23 for the semiconductor wafer 20, and that an aluminum film 24 is formed by deposition and the like thereon, and a photoresist is then applied, and that exposure developping, and etching of the bar code 21 are made.

The bar code 21 obtained by the aforementioned manner is subjected to irradiation of infrared rays of wavelength of more than 1000 nm by means of a light source 50 such as incandescent lamp or the like to allow infrared rays SK to penetrate a zone 25 each of the oxide film ($S_iO_2$) 22 and the base material ($S_i$) 23, which is defined by the alminum film 24 so that penetrated infrared rays TK are outputted whereas another zone covered with the aluminum film 24 is little penetrated with the infrared rays SK. Now, the penetrated infrared rays TK are read by a bar code reader. Thus read the bar code 21 formed on the semiconductor wafer 20. In this connection, it is noted that the bar code 21 may be read out without being influenced by reflection of the infrared rays SK on the surface of the semiconductor wafer 20.

Figure 4:
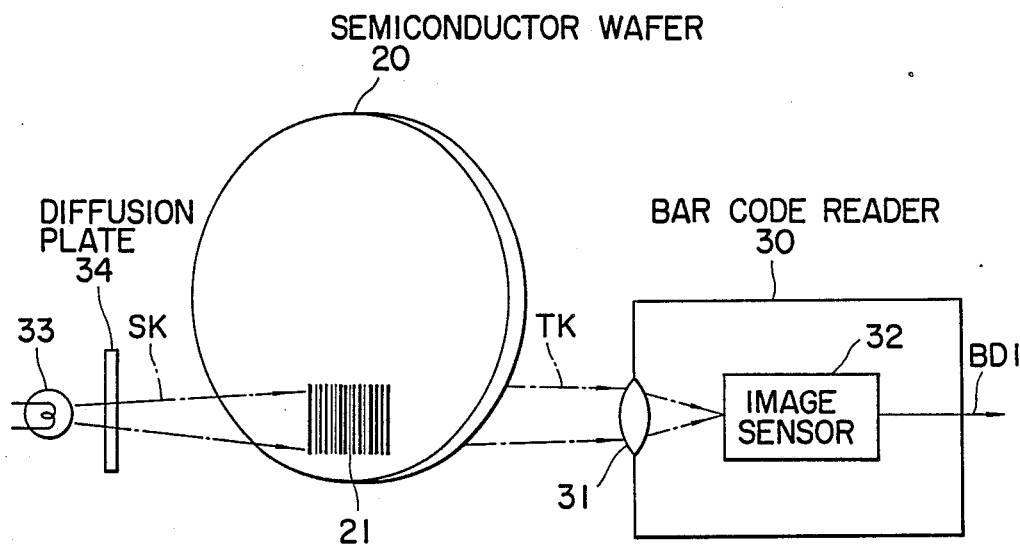
FIG. 4 is a view showing the manner in which the bar code of the invention is read.

FIG.4 shows a method of reading out the bar code 21 to which the aforementioned principle is applied. The semiconductor wafer 20 which carries the bar code 21 is disposed centrally of a system as shown in FIG.4. A light source is arranged leftwardly of the semiconductor wafer 20 and comprises an incandescent lamp 33 and a diffusion plate 34 to emit uniform infrared rays SK. On the other hand, a bar code reader 30 is disposed rightwardly (back of the bar code 21) of the semiconductor wafer 20 and on the surface in opposition to the bar code 21 and comprises an optical system 31 for focussing the penetrated infrared rays TK and a linear and one dimensonal CCD image sensor 32 which is adapted to receive the focussed and penetrated infrared rays TK to output a bar code data BD1.

With this arrangement, the infrared rays SK generated from the light source are diffused and irradiated on the whole of the bar code 21 on the semiconductor wafer 10. The wafer 20 is penetrated with the infrared rays TK from its back. At the sometime, the whole of the penetrated infrared rays TK are received by the one-dimensionally arranged image sensor 32 within the bar code reader 30 to output the photoelectrically transduced bar code date BD1.

Figure 5:
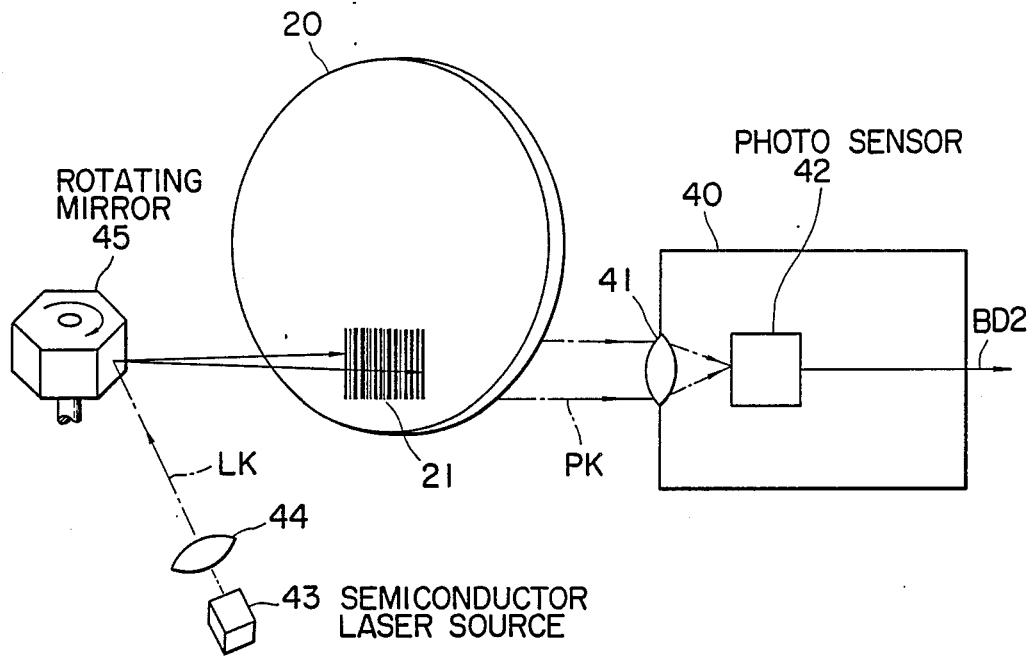
FIG. 5 is a representation showing another manner in which the bar code of the invention is read.

FIG.5 is a view showing another method of reading out of the bar code 21 which the aforementioned principle is applied, wherein laser beams in an infrared region is used as the infrared rays. As shown, a light source is located leftwardly of the semiconductor wafer 20 and comprises a semiconductor laser source 43 for outputting laser beams of wavelength of 1200~1400 nm, used for an optical fiber communication, an optical system 44 for condensing the laser beams LK from the semiconductor laser source 43 into a rotating mirror 45 for irradiation thereof, and the rotating mirror 45 for scanning the laser beams LK on the bar code 21 on the semiconductor wafer 20. A bar code reader 40 is positioned rightwardly of the semiconductor wafer 20 (back of the bar code) and on the surface in opposition to the bar code 21 and comprises an optical system 41 for focussing the penetrated laser beams PK, and an photo sensor 42 such as a photodiode or the like which is adapted to receive the focussed and penetrated laser beams PK so as to output a bar code data BD2.

With this arrangement, the laser beams LK generated from the light source are irradiated by the rotation of the rotating mirror 45 into the bar code 21 on the semiconductor wafer 20 and are scanned thereon.

The penetrated laser beams PK which have penetrated the semiconductor wafer 20 are focussed by the optical system 41 and then received by the photo sensor 42 for outputting the bar code date BD2, electrical signal from the bar codereader 40.

Figure 6:
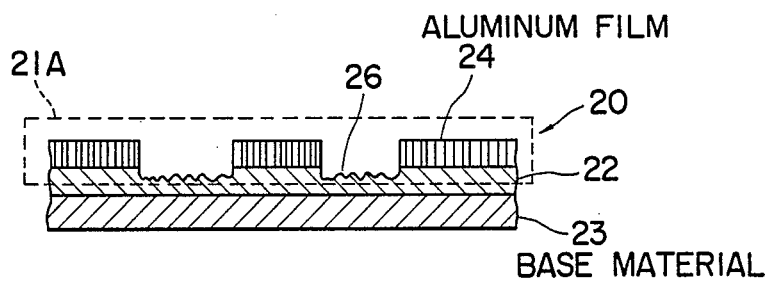
FIG. 6 is a view showing a method of manufacturing another bar code of the invention.

FIG.6 shows a method of manufacturing another form of the bar code, wherein the oxide film ($S_iO_2$) 22 is formed on the base material ($S_i$) 23 for the semiconductor wafer 20, on the surface of which the aluminum film 24 is formed by deposition and the like, the surface being trimmed with laser beams (for example, pulse $CO_2$ laser, YAG laser or the like) to obtain the bar code 21A.

The bar code 21A obtained in the manner as above mentioned, is susceptible of penetration of the infrared rays through a zone 26 each of the oxide film ($S_iO_2$) 22 and the base material ($S_i$). which is defined by the aluminum film 24 whereas another zone covered with the aluminum film 24 is not penetrated with the infrared rays so that the aforementioned method of reading out the bar code may be applied as it is.

Although the embodiment has been described by taking $S_i$ for the semiconductor wafer, this invention may, of course, be carried out by use of another semiconductor wafer so far as the material is capable of penetration of the infrared rays therethrough. In this instance, the aluminum film is used for manufacturing the bar code, another material may be, however, employed if it is capable of reflecting or absorbing the infrared rays when it is formed on the wafer.

As set forth hereinbefore, according to the bar code and the method of reading the bar code in accordance with the invention, in recognition that the semiconductor wafer is not penetrated with the infrared rays when it is partially or wholly covered with the film of aluminum or the like, the infrared rays are irradiated on the bar code formed of the film of aluminum or the like on the wafer, to read out the penetrated infrared rays from the semiconductor wafer by the bar code reader so that a bar code reading may be effectively made without being influenced by reflection of the wafer surface and by surface profile.

It should be understood that many modifications and adaptations of the invention will become apparent to those skilled in the art and it is intended to encompass such obvious modifications and changes in the scope of the claims appended hereto.

What is claimed is:

1. A bar code characterized in that said bar code in formed of a member for reflecting or absorbing infrared rays on a semiconductor wafer which is penetrated with said infrared rays.

2. A bar code as recited in claim 1 wherein said semiconductor wafer is silicon.

3. A bar code as recited in claim 1 wherein an etching technique is employed for forming said bar code.

4. A bar code as recited in claim 1 wherein a trimming technique is employed based on laser beams for forming said bar code.

5. A bar code as recited in claim 1 wherein an aluminum film is used in said member which is penetrated with said infrared rays.

6. A method of reading a bar code characterized in that said bar code which is formed of a member for reflecting or absorbing infrared rays on a semiconductor wafer is irradiated by infrared rays, and that penetrated infrared rays from said semiconductor wafer is read out by an optical sensor.

7. A method of reading a bar code as recited in claim 6 wherein a means for irradiating said infrared rays comprises an incandescent lamp and a diffusion plate for diffusing infrared rays from said incandescent lamp.

8. A method of reading a bar code as recited in claim 6 wherein said means for irradiating said infrared rays comprises a semiconductor laer, and a rotary mirror as well as an optical means for scanning said infrared rays from said semiconductor laser on said bar code.

9. A method of reading a bar code as claimed in claim 6 wherein said optical sensor is a one-dimensional CCD element.

10. A method of reading a bar code as recited in claim 6 wherein said optical sensor is a dot optical sensor.

* * * * *